July 15, 1947.   G. W. BLESSING   2,423,870
COMPOSITE SHEET METAL STRUCTURE
Filed March 26, 1941   2 Sheets-Sheet 2
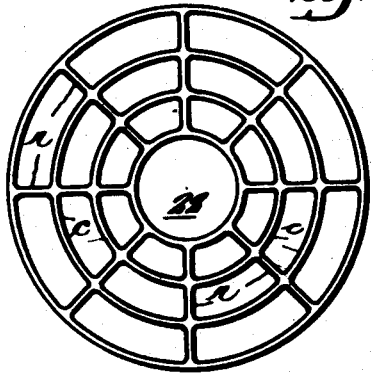
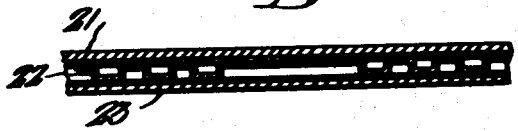
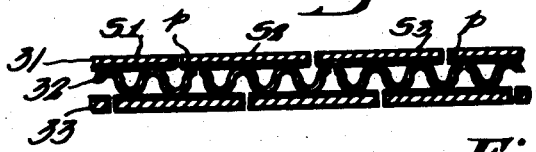
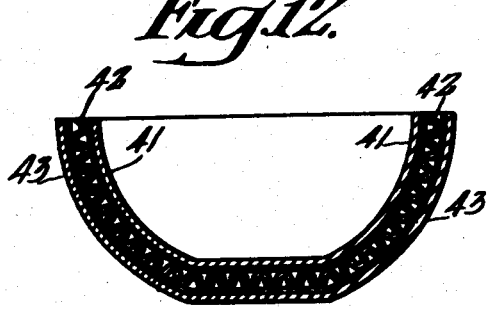
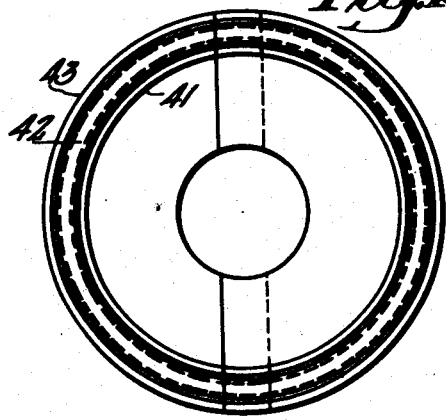
Inventor
Gregory W. Blessing
By
Attorney Patented July 15, 1947

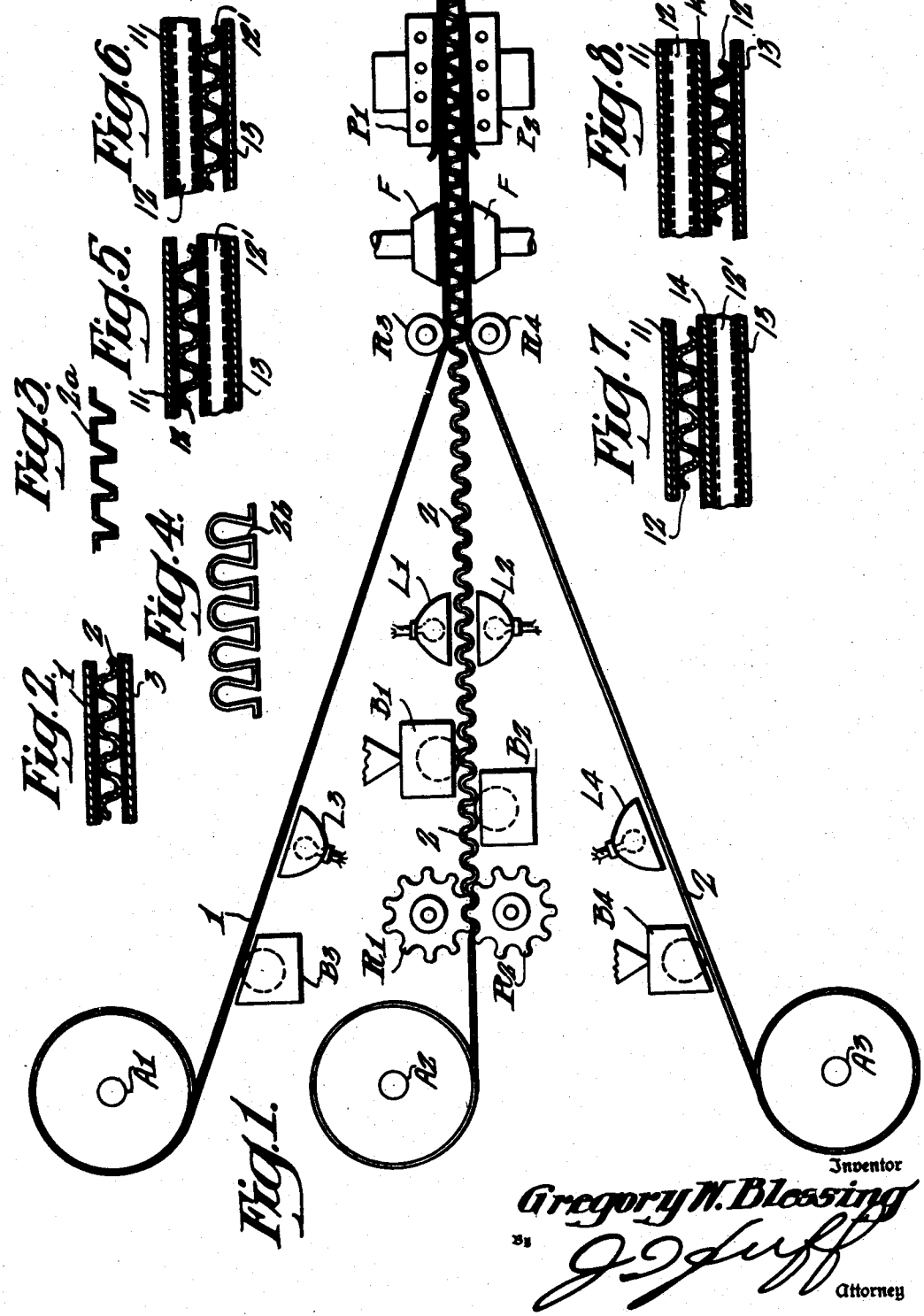

2,423,870

UNITED STATES PATENT OFFICE 2,423,870

COMPOSITE SHEET METAL STRUCTURE

Gregory W. Blessing, Moorestown, N. J., assignor to Radio Corporation of America, a corporation of Delaware Application March 26, 1941, Serial 385,229

6 Claims. (Cl. 154—129)

This invention relates to composite sheet metal structures and to methods of making the same.

My copending application Serial No. 359,129 (RCV D-7943), filed September 30, 1940, describes a method of manufacturing composite metal structures whereby and wherein the parts are united in rigid and strong permanent relation by means of certain temperature-responsive adhesives or bonding materials without the use of rivets, bolts, screws, solder, welds, embedments, or other auxiliary clamps or bonds. The strength of the bonds achieved by the process described in the said earlier filed case compares favorably with bonds formed by actual fusion (as in welding) of the metal surfaces and, in many instances, has proven so strong that, in attempting to destroy the bond, fragments of the metal continued to adhere to the bonding material after the structure had been pulled apart by the relatively enormous force of the testing apparatus.

The present invention contemplates the use of the said earlier described "thermoplastic fusion process" in the manufacture of sheet metal structures of great strength and of a construction calculated to obviate the necessity for the auxiliary frames, ribs, struts, braces, girders, etc., heretofore thought essential to the assembly and successful operation of sheet metal structures designed for similar conditions of use. By way of example, the present invention dispenses, in whole or in part, with the interior framework heretofore necessarily employed in the sustaining wings and other airfoils of aircraft, and permits the construction of these and similar sheet metal parts (e. g., the fuselage, cowling, hoods, etc.) without the use of rivets or of welding. The present invention also has special utility in the manufacture of reinforced bright metal or plated metal structures (e. g., table tops, drain boards, mirrors, doors, panels, etc.) since, in every case, the backing or reinforcement may be applied without in any wise marring the exposed surfaces of the metal.

The product of the present invention may comprise a sheet metal structure of a form analogous to that commonly employed in reinforced cardboard, that is to say, it may comprise one or more noncorrugated metal sheets and one or more corrugated or other metal backings or inserts bonded into a composite structure by means of a suitable bonding material. In accordance with the process of the invention, the bonding operation involves the use of temperatures greatly in excess of that required to render the bonding material fluid or tacky, yet not so great as to cause complete pyrolysis of the bonding material, and below the melting point of the metal.

Certain details of construction, together with other objects and advantages will be apparent and the invention itself will be best understood by reference to the following specification and to the accompanying drawings, wherein Figure 1 is a partly diagrammatic side elevational view of one form of an apparatus which may be employed in carrying the invention into effect, Figure 2 is a fragmentary side elevational view of a reinforced sheet metal structure constructed in accordance with the invention, Figures 3 and 4 are side elevational views of alternate forms of reinforcing sheets, which may be employed in the structure shown in Fig. 2, Figures 5 and 6 are front and side sectional views, respectively, of a sheet metal structure constructed in accordance with the invention to withstand stresses of extraordinary magnitude, Figures 7 and 8 are front and side sectional views, respectively, of another form of doubly reinforced sheet metal structure, Figure 9 is a plan view of a reinforcing sheet provided with concentric and radial reinforcements, Figure 10 is a fragmentary sectional view of a structure incorporating the reinforcing sheet of Fig. 9, Figure 11 is a side elevational view showing one method of uniting two abutting reinforced structures into a single structure, Figure 12 is a cross-sectional view and Figure 13 a top plan view of a dome-shaped sheet metal structure, and Figure 14 is a sectional elevational view of a sustaining airfoil constructed in accordance with the principles of the invention.

The machine or apparatus of Fig. 1 is designed to unite three steel or other similar or dissimilar metal sheets 1, 2 and 3, respectively, by a continuous process, into the tri-part composite sheet metal structure of Fig. 2. As in the earlier described process, the parts to be united must first be thoroughly cleansed and it will be understood that the said discrete metal sheets have been thoroughly cleansed preferably immediately prior to subjecting them to the action of the machine. In this case, the separate sheets are fed to the machine from the shafts or drums $A^1$, $A^2$, $A^3$, respectively, upon which the metal has been wound, though, if desired, suitable guide rollers (not shown) may be provided in place of the shafts in the event that the metal is to enter the machine as it emerges from the oven or other drier (not shown) usually employed in the cleansing process.

A set or pair of metal corrugating rolls $R_1$ $R_2$ is provided in the path of the central metal sheet 2 for corrugating it transversely with respect to its direction of travel. The particular corrugating rolls here illustrated operate to impart rounded crest undulations in the sheet 2, though obviously the teeth of the rollers may be of a form calculated to provide flat crests similar, by way of example, to that shown at 2a in Fig. 3. Other types and forms of corrugated surfaces, such, for example, as the Phosphor-bronze sheet shown in Fig. 3, wherein the perpendicular legs 2b toe inwardly (to increase its resiliency), may require means other than rollers in their fabrication. The invention obviously is not limited to any particular method or means for shaping the intermediate sheet 2, nor indeed to any particular spacing or shaping of the crests and salient angles of the insert or inserts since, ordinarily, the type of reinforcement will be chosen with regard to the intensity and direction of the stresses to which the finished structure may be subjected in use. Nor is the invention limited in its useful applications to any particular kinds or gauge or sheet metal.

Subsequent to being corrugated, the intermediate or backing sheet 2 is coated on both sides, preferably with a synthetic resinous bonding material which may be applied in a fluid state as by means of rollers or brushes $B_1$, $B_2$. At the same time, a similar coating may be applied to the inner surfaces of the flat-surfaced outer metal sheets 1 and 3 as by brushes or rollers $B_3$, $B_4$, respectively.

Not all synthetic resinous materials lend themselves to the practice of the invention. Among the preferred materials are polyvinyl acetate and "hydrolyzed" polyvinyl acetate. The latter material is sold by the Union Carbide and Chemicals Corporation under the grade mark XL5075 and is understood to comprise a 28%, by weight, solution of polyvinyl acetate in methyl acetate. Excellent results have also been achieved with the "Glyptal" resins.

"Glyptal" is the trade name used by the General Electric Company to designate a patented class of alkyd resins which it manufactures and sells. Hovey Patent 1,925,903 dated September 5, 1933, relating to a cementing composition consisting of nitrocellulose and a modified alkyd resin may be referred to for a complete definition of this type of resin. The General Electric Company's grade mark for their thermoplastic cement containing polyvinyl acetate is ZV 5057 (now #2142).

In the interests of economy, the bonding material for the intermediate sheet 2 may be confined to the crests of the corrugations, though in some cases, as where the metal is not immune to moisture, the entire surface area of this reinforcing member may be coated. The coating or coatings, in any event, should preferably be thick enough to prevent the formation of holes therein when the solvents, ordinarily present in the bonding material at the time of its application, are evaporated by heat which, in this case, is shown as supplied by infra-red lamps $L_1$, $L_2$, $L_3$ and $L_4$, or other suitable means.

The separate sheets 1, 2 and 3, with their now dried coatings of the bonding material, are brought together as by guide rollers $R_3$, $R_4$, which are preferably arranged to exert a slight compression force thereon. The still unbonded sheets 1, 2 and 3 next pass through an oven or furnace, exemplified by the induction furnace F, where the bonding material attains a temperature (say, 200 degrees–300 degrees C.) greatly in excess of that required to soften it, yet not so great as to cause complete pyrolysis or complete thermal decomposition of the said material nor melting of the metal or metals comprising the sheet material.

When the bonding material has been brought to the desired temperature, a bonding force of, say, 100 to 1000 pounds per square inch is applied to the stack as by means of a pair of oppositely located pressure plates $P_1$, $P_2$, and thereafter cooled, preferably under pressure. To facilitate cooling of the pressure plates or pads, water may be circulated through their interiors.

As is the process described in the earlier filed case, there may be said to be a definite relation between temperature, time of pressure, and, to some degree, pressure applied. As a general rule, the pressure to be applied varies inversely (but not proportionately) with respect to the applied temperature. In all cases, however, the thermoplastic material changes color just below its decomposition point, and this affords a satisfactory indication of the proper time to move the structure away from the source of heat. This point is reached in the above-mentioned usually colorless thermoplastic materials, when the material presents a "scorched appearance" or assumes a brownish or straw-colored hue.

Referring to Figs. 5 to 8 inclusive, structures capable of withstanding shearing forces of extraordinary magnitude may be achieved by the use of a plurality of corrugated metal sheets arranged with the corrugations of one sheet disposed at an angle or askew with respect to the other or others. Figs. 5 and 6 are front and side elevational views, respectively, of a sheet metal structure comprising a top sheet, here designated 11, a bottom sheet 13, and two intermediate corrugated sheets 12 and 12', respectively, disposed with their corrugations at an angle to each other and all bonded, in accordance with the invention, into a composite structure. In the sheet metal structure shown in Figs. 7 and 8, the corrugated sheets 12, 12', instead of being bonded to each other, are bonded to the opposite surfaces of an intermediate noncorrugated metal sheet 14.

As previously indicated, the patterns of some reinforcing sheets do not lend themselves to the use of corrugating rollers in their fabrication. Thus, in some cases, resort may be had to other known methods, e. g., drawing, contraction, bending, stamping, embossing, etc.

Figure 9 shows an embossed reinforcement 22 for a turntable or other circular structural member wherein (as viewed in the drawing) the surface areas to which the top and bottom sheets 21, 23, respectively (Fig. 10) are bonded are defined by concentric and radially extending ridges $c$ and $r$, respectively. As in the other embodiments of the invention thus far described, the bottom sheet 23 may be omitted, if desired, at some sacrifice in the strength of the structure.

It is not to be inferred from the foregoing that the invention is limited in its useful application to sheet metal structures wherein the reinforcing element comprises a continuous piece or, indeed, to structures wherein the facing sheet or sheets comprise relatively plane surfaces.

The invention lends itself readily to the assembly of several otherwise finished sections into a unitary structure. Thus, referring to Fig. 11, in order to bond the separate sheet metal sections S1, S2, and S3 into a unitary structure, it is merely necessary to insert a projecting portion p of the coated reinforcing piece 32 of one section into contact with the inner coated surfaces 31 and 33 of an adjacent section and to subject the thermoplastic on the overlapping areas of the several surfaces to the conditions of temperatures and pressure employed in making the separate sections.

As above indicated, and as shown in Figures 12 to 14 inclusive, the invention is not limited to sheet metal structures wherein the reinforcing and facing sheets comprise structures wherein the reinforcing and facing sheets comprise relatively plane surfaces. Referring particularly to the bowl-shaped, cowl, hood, or receptacle of Figures 12 and 13, the facing sheets 41 and 43 and the intermediate corrugated reinforcing sheet 42 may either be prefabricated in a known manner, as from a single sheet of metal, or they may be made in several sections, as indicated by the section line in Figure 13, and assembled in the manner described in the section with Figure 11.

As set forth in the third paragraph of this disclosure, the invention may be applied to the construction of airfoils and other structural members for aircraft. Thus, there is shown in cross-section in Figure 14 a sustaining wing comprising a substantially perfectly smooth outer metal sheet 51, an inner sheet 53, and an intermediate corrugated reinforcing sheet 52. In this case, the opposite ends of the inner and outer sheets are bonded together, as indicated at T to form the trailing edge of the wing, while the corrugated intermediate sheet 52 extends from a point slightly inwardly of this four-ply edge to reinforce the cambered top and bottom surfaces and the leading edge U. The advantages of this airfoil reside not only in its simplicity and economy of parts, its smooth surfaces, strength, rigidity, and light weight, but also in the ability of its three-ply construction to resist puncturing.

Various other applications and modifications of the invention will suggest themselves to those skilled in the art. It is to be understood, therefore, that the foregoing is to be interpreted as illustrative and not in a limiting sense, except as required by the prior art and the spirit of the appended claims.

What is claimed is:

1. Method of uniting sheet metal parts with an interposed thermoplastic adhesive which consists in advancing said sheets and said adhesive simultaneously in a predetermined direction while (a) subjecting said adhesive to partial pyrolysis, (b) said sheets and said partially pyrolyzed adhesive to a bonding force, and (c) the resulting structure to cooling.

2. Method of uniting sheet metal parts provided with a dried coating of thermoplastic adhesive on their facing surface which consists in moving said coated sheets simultaneously in a given direction, subjecting said moving coated sheets to a temperature below the melting point of the metal yet sufficiently high to initiate thermal decomposition in said thermoplastic adhesive, applying a bonding force to said heated moving coated sheets and then cooling the resulting structure while continuing said bonding force and said movement.

3. A structural member comprising superimposed layers of sheet metal united at spaced areas on their facing surfaces with a partially pyrolyzed thermoplastic adhesive.

4. A structural member including a metal sheet provided with corrugations and a noncorrugated metal sheet joined to said corrugations by a thermoplastic adhesive at a temperature near the pyrolyzing temperature of said adhesive and below the melting point of said metal.

5. A structural member comprising at least one sheet metal member and at least one metal reinforcing member therefor, said reinforcing member having a plurality of ridges on a surface thereof, and means comprising a partially pyrolyzed thermoplastic forming an intimate bond between a surface of said first-mentioned member and the crest portions of the ridges of said second-mentioned member.

6. An airfoil including a hollow sheet metal structure comprising a corrugated sheet metal reinforcing member, and a smooth-surfaced outer metal sheet joined to the crests of said corrugated metal sheet by a partially pyrolyzed thermoplastic adhesive.

GREGORY W. BLESSING.

REFERENCES CITED

The following references are of record in the file of this patent:

UNITED STATES PATENTS

| Number | Name | Date |
|---|---|---|
| 2,060,035 | Chaney | Nov. 10, 1936 |
| 2,129,478 | Rohm | Sept. 6, 1938 |
| 2,149,732 | Groff | Mar. 7, 1939 |
| Re. 16,201 | Quay | Nov. 3, 1925 |
| 2,234,517 | Coffman | Mar. 11, 1941 |
| 2,333,343 | Sendzimir | Nov. 2, 1943 |

FOREIGN PATENTS

| Number | Country | Date |
|---|---|---|
| 482,747 | Great Britain | 1938 |